United States Patent
Baras

(10) Patent No.: US 11,212,969 B1
(45) Date of Patent: Jan. 4, 2022

(54) TIMED VERTICAL PLANT TRANSPORT IN INDOOR FARMING

(71) Applicant: Area 2 Farms, Inc., Washington, DC (US)

(72) Inventor: Tyler Baras, Pacifica, CA (US)

(73) Assignee: Area 2 Farms, Inc., Washington, DC (US)

( * ) Notice: Subject to any disclaimer, the term of this patent is extended or adjusted under 35 U.S.C. 154(b) by 0 days.

(21) Appl. No.: 17/461,314

(22) Filed: Aug. 30, 2021

Related U.S. Application Data

(63) Continuation of application No. 17/314,904, filed on May 7, 2021.

(51) Int. Cl.
  *A01G 9/14* (2006.01)
  *A01G 9/24* (2006.01)
  *A01G 9/02* (2018.01)

(52) U.S. Cl.
  CPC ............. *A01G 9/143* (2013.01); *A01G 9/249* (2019.05); *A01G 9/02* (2013.01)

(58) Field of Classification Search
  CPC ........... A01G 9/143; A01G 9/02; A01G 9/249
  See application file for complete search history.

(56) References Cited

U.S. PATENT DOCUMENTS

| 417,817 | A | * | 12/1889 | Floyd | A01G 9/143 |
| | | | | | 104/129 |
| 2012/0060414 | A1 | * | 3/2012 | Olsson | A01G 9/143 |
| | | | | | 47/65 |
| 2015/0282437 | A1 | * | 10/2015 | Ohara | A01G 7/045 |
| | | | | | 47/66.6 |
| 2016/0212946 | A1 | * | 7/2016 | Higgins | A01G 9/1423 |
| 2016/0270304 | A1 | * | 9/2016 | Higgins | A01G 31/04 |
| 2018/0359973 | A1 | * | 12/2018 | Millar | A01G 9/143 |
| 2019/0307077 | A1 | * | 10/2019 | Lert, Jr | A01G 9/022 |

FOREIGN PATENT DOCUMENTS

GB  922293 A  *  3/1963  ............. A01G 9/143

* cited by examiner

*Primary Examiner* — Monica L Barlow
(74) *Attorney, Agent, or Firm* — Baker Botts L.L.P.

(57) ABSTRACT

A multi-level vertical farm comprises a lift apparatus configured to carry growth trays from a bottom to a top position adjacent to a conveyor. The conveyor is configured to transport trays downwardly to near the bottom position and normally is fully loaded with adjacent trays along the entire conveyor. A growth tray in the lowest, bottom position is discharged out of that position to an irrigation or harvesting station. The discharge of a tray from the bottom position causes preceding trays to move downward, thereby opening a space in the top position for another tray, which may be lifted there. A computer system may be connected to the apparatus and programmed to start a motor of the lift apparatus to move the growth trays. The apparatus enables simulating a day-night plant growth cycle, and using thermal convection to apply more warmth to higher positions, in a compact vertical arrangement.

24 Claims, 6 Drawing Sheets

TIMED VERTICAL PLANT TRANSPORT IN INDOOR FARMING

BENEFIT CLAIM

This application claims the benefit under 35 U.S.C. § 120 as a continuation of application Ser. No. 17/314,904, filed May 7, 2021, the entire contents of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Area 2 Farms, Inc.

TECHNICAL FIELD

One technical field of the present disclosure is vertical farming apparatus. Another technical field is apparatus and processes for automation of multi-layer horticultural structures and associated crop handling equipment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Indoor vertical farms have been established in many urban and semi-urban locations. Typically, these farms comprise a large number of modular growth trays that serve as carriers for plants, growth media, and sometimes lighting and irrigation apparatus. The trays may be arranged in vertical stacks. In many cases, trays remain in an established vertical position during the entire growth cycle, receiving water, light, and nutrients at a set tray location in a vertical stack. As plants mature and reach harvest, trays are moved vertically to a transport position and then transported horizontally to a harvesting station at which sellable crop products are removed, waste is recycled or discarded, and trays are prepared for another planting cycle. While this approach is workable, it has at least three significant disadvantages.

First, the overall size of the farm is typically large, such as in excess of 10,000 square feet; extensive lateral workspace is necessary to move trays and accommodate transport apparatus.

Second, the use of consistent lighting at all trays of a tall vertical stack tends to cause differential thermal layers to form within the indoor farming space or building. For example, the ambient temperature at the top of a tall vertical stack may be ten degrees or more higher than at the bottom of the stack. Consequently, if the same crop is planted in all growth trays of the stack, different trays will experience significantly different growth times and maturation rates depending upon the ideal ambient temperature for the crop. Furthermore, switching the entire room between day and night climates requires a drastic shift in temperature and humidity twice per day, causing ventilation and air conditioning (HVAC) equipment of the building to run too often or too long in an effort to balance the ambient temperature of the interior space. The result is wasted power and the oversizing of HVAC equipment.

Third, in many cases, every tray must have dedicated irrigation plumbing and lighting apparatus to permit irrigation and lighting at all vertical locations of a stack, which contributes to complexity and increases labor costs. For example, in some vertical farms, a human must use a lift or other equipment to reach the top tray of a vertical stack to enable disconnecting irrigation lines and electrical supplies before the tray can be moved downward.

These drawbacks become acute when the overall size of an indoor farm becomes smaller. For example, if the total farm size is in the range of 1,000 to 5,000 square feet, then these disadvantages become serious. For vertical farms to proliferate and become more useful to larger populations, there is a need to establish such farms in smaller buildings, such as in retail storefronts located in suburban or urban retail streets or downtown locations. To be physically practical and economically viable, these compact downtown indoor farms need new apparatus and processing techniques.

SUMMARY

The appended claims may serve as a summary of the invention.

DETAILED DESCRIPTION

Figure 1:
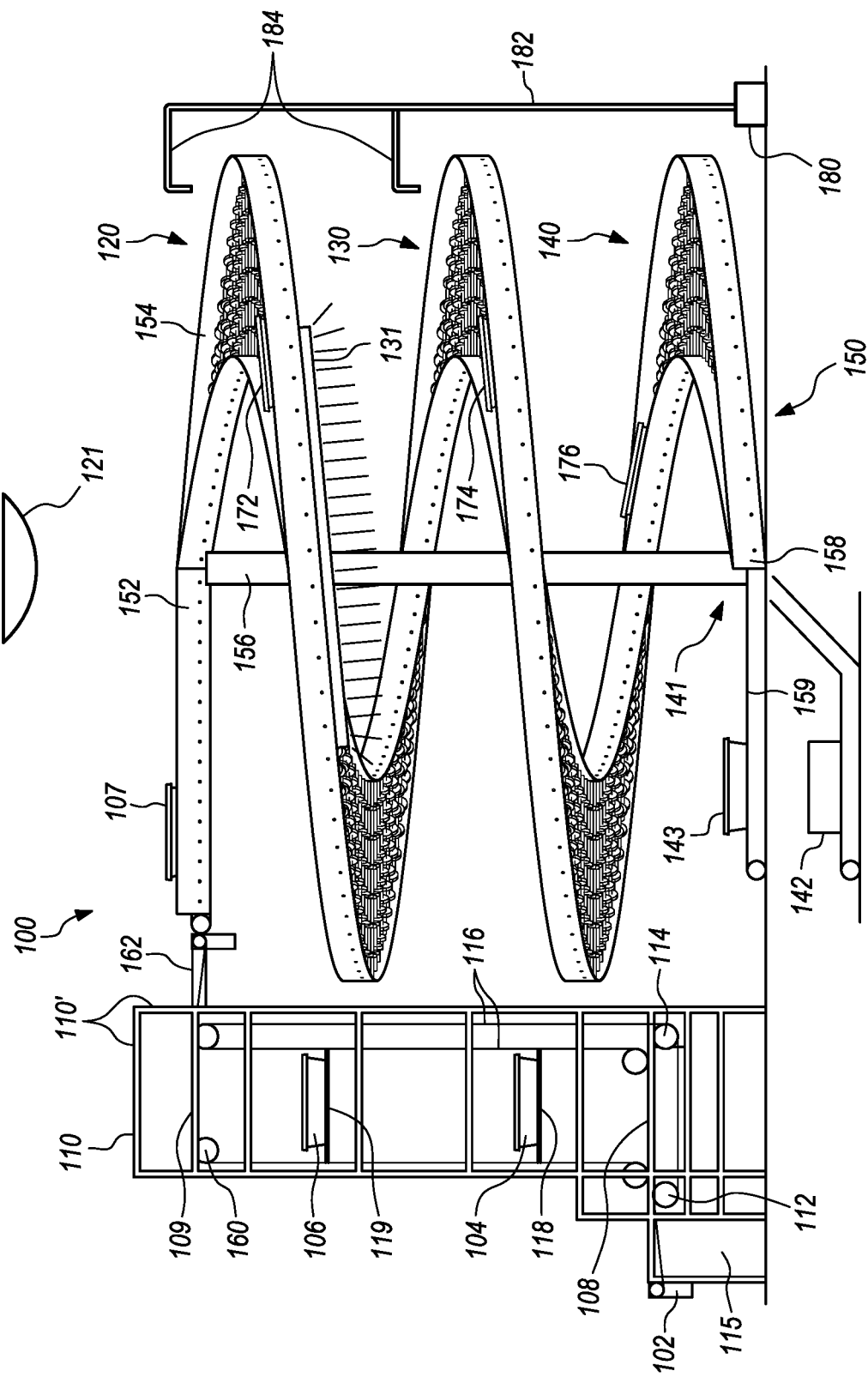
FIG. 1 illustrates an example vertical farming apparatus with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

To the extent that this disclosure describes computer-implemented processes, the text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
3. Implementation Example—Hardware Overview 1. General Overview In one embodiment, the disclosure provides a vertical farming method and apparatus designed to more evenly distribute thermal layers among a plurality of growth trays that are in a vertical structure. The ideal mechanisms to create the proper temperature distribution and humidity levels will vary by climate, crop type, and the structure in which a vertical farm apparatus is located. In some embodiments, a vertical farm apparatus may be contained in a building or structure with a humidifier or dehumidifier, and other embodiments may omit either a humidifier or dehumidifier. In some embodiments, a vertical farm apparatus may be contained in a building or structure with air circulation apparatus configured to draw air from an external environment using an intake; other embodiments may use an exhaust ventilation system to discharge ambient air. Embodiments are independent of the climate directly around and inside the building or structure that contains a vertical farm.

In some embodiments, an apparatus facilitates vertical and lateral movement of growth trays on a schedule, passing through several thermal layers and locations with varying levels of light and/or irrigation, to imitate a natural day and night cycle without requiring large physical space and/or extensive labor. For example, these approaches allow staff to input instructions to a computer to start the movement of an apparatus at specified time intervals or periods, causing trays to spend equal amounts of time at different stations in different thermal layers or levels of light. In one embodiment, growth trays may be transported between the third, second and first stations within a 12 to 30 hour period. In an embodiment, the use of time intervals of these lengths may simulate a day with warm temperatures in the third station and/or second station and a night with cooler temperatures in the first station.

The vertical movement of the growth trays through several thermal layers may simulate the daily temperature fluctuations that plants naturally experience during periods of day and night. In an embodiment, the rotation of growth trays allows crops to experience the full range of temperatures that may exist between the top and bottom of the apparatus. The apparatus may use heat generated from one or more artificial lights to develop convection currents that create the thermal layers throughout vertical stations. These convection currents encourage warmer temperatures in a third or top station and cooler temperatures in a first or bottom station. The difference in temperature between the first and third station can be as little as five degrees Fahrenheit (−15 degrees Centigrade) to over 20 degrees Fahrenheit (−7 degrees Centigrade). Further, embodiments may reduce costs and complexity of capital equipment by requiring fewer artificial lights and irrigation plumbing. The disclosed approaches may also save on labor costs by automatically moving crops near to staff for checking and harvesting, thus reducing or eliminating the need for frequent use for ladders and scissor lifts to reach growing trays in upper levels of vertical farms.

In an embodiment, three or more stations for growth trays are defined at different vertically separated levels of a vertical farming apparatus. A first station is at a bottom level, one or more second stations are in an intermediate position, and a third station is at a top level. In an embodiment, all vertical levels between the bottom level and top level are treated similarly and a plurality of second stations may be defined at multiple different vertical levels spaced apart between the bottom level and top level.

In some embodiments, a transport apparatus is configured for transporting growth trays in a multi-level transport structure. The transport apparatus comprises an elevator with a drive mechanism and lift elements to elevate growth trays from a lower-most to an upper-most station. The apparatus further comprises one or more artificial lights to light one or more of the growth trays in one or more of the middle stations and the top stations, and a roller conveyor to convey the trays from the third back to the first station. Finally, the apparatus comprises a control computer coupled to the first station, the transport elevator, and the third station programmed to move the trays between stations and hold them for certain periods of time.

In an embodiment, the disclosure provides an apparatus for transporting growth trays in a multi-level farming structure, the apparatus comprising transport means for selectively elevating one or more of the growth trays from a first station at a lowest vertical level, through one or more second stations at intermediate higher vertical levels, to a third station at a highest vertical level; means for artificially lighting one or more of the growth trays at one or more of the second stations and for forming thermal layers near the first station, the one or more second stations, and the third station; conveying means for receiving a particular one of the growth trays from the third station and convey the particular one of the growth tray to the first station; control means that is communicatively coupled to the first station, the transport means and the third station, for causing the transport means to transport the growth trays successively from the first station, to the third station, to one or more of the second stations, and then back to the first station through the thermal layers.

In one feature, the means for artificially lighting is powered to generate heat to form the thermal layers. In another feature, the means for artificially lighting is powered to generate the thermal layers having a temperature difference between the first station and the third station ranging from five degrees F. to 20 degrees F. In a further feature, the control means is configured for causing the transport means to transport the growth trays successively from the first station, to the third station, to one or more of the second stations, and then back to the first station through the thermal layers to simulate natural daily day and night temperature fluctuations.

In an embodiment, the disclosure provides a method of transporting growth trays in a multi-level farming structure, the method comprising selectively elevating one or more of the growth trays from a first station at a lowest vertical level, through one or more second stations at intermediate higher vertical levels, to a third station at a highest vertical level; artificially lighting one or more of the growth trays at one or more of the second stations and for forming thermal layers near the first station, the one or more second stations, and the third station; receiving a particular one of the growth trays from the third station and convey the particular one of the growth tray to the first station; transporting the growth trays successively from the first station, to the third station, to one or more of the second stations, and then back to the first station through the thermal layers.

In one feature, the artificial lighting generates heat to form the thermal layers. In another feature, the lighting generates the thermal layers having a temperature difference between the first station and the third station ranging from five degrees F. to 20 degrees F. In yet another feature, the method further comprises transporting the growth trays successively from the first station, to the third station, to one or more of the second stations, and then back to the first station through the thermal layers to simulate natural daily day and night temperature fluctuations.

2. Structural & Functional Overview

FIG. 1 illustrates an example vertical farming apparatus with which one embodiment could be implemented. In an embodiment, a vertical farming apparatus 100 comprises an elevator 110, powered by a motor 102, configured to lift a plurality of growth trays 104, 106 from a first station 108 to a third station 109. Stations 108, 109 are vertically spaced apart by a distance ranging from a few feet or meters to dozens of feet or meters. Elevator 110 may comprise a plurality of frame members 110' such as steel bar or steel tube that are affixed via welding or fasteners to form a fixed, rigid frame in which growth trays travel and on which elevator drive elements are mounted or affixed. Elevator 110 may comprise a plurality of drive wheels and idler wheels 112, 114 that are mechanically coupled to motor 102 via one or more continuous belts 116 affixed to lifting surfaces 118, 119 to form a continuously operable lift mechanism capable of lifting trays 104, 106 when empty or when fully loaded with growth medium, seeds, plants, and water embedded in the growth medium or in a part of the tray. The foregoing elements may comprise one example of transport means for selectively elevating one or more of the growth trays from a first station at a lowest vertical level, through one or more second stations at intermediate higher vertical levels, to a third station at a highest vertical level. The specific structure of elevator 110 and the other elements of this paragraph are not required and vertical actuators, hydraulics, or other lifting or elevating apparatus may be used in other embodiments as the transport means.

In an embodiment, the apparatus comprises control means that is communicatively coupled to the first station, the transport means and the third station, for causing the transport means to transport the growth trays successively from the first station, to the third station, to one or more of the second stations, and then back to the first station through the thermal layers. For example, elevator 110 further comprises a processor housing 115, usually near the motor 102, comprising a control computer that may drive operation of the elevator under stored program control. The control computer, which is further described in other sections herein, may incorporate wireless networking communication interfaces to deliver a graphical user interface or other user interface to a compatible browser, application or app of a mobile computing device, and to receive input signals and commands relating to elevator action from the mobile device.

The third station 109 is associated with an uppermost lifting position of the elevator 110. In an embodiment, third station 109 may comprise a horizontal discharge mechanism 160 that is configured to drive a growth tray 107 laterally away from or out of the third station to an exit assembly 162 that is adjacent to a horizontal receiving segment 152 of conveying means for receiving a particular one of the growth trays from the third station and convey the particular one of the growth tray to the first station, such as a roller conveyor 150. The motor 102 may drive the horizontal discharge mechanism 160 via a dedicated set of belts and pulleys, gears or wheels, or the horizontal discharge mechanism may operate using solenoids, air-driven actuators, or other electro-mechanical means, under control of the control computer, to drive the growth tray laterally away from or out of the third station to the exit assembly. In an embodiment, the horizontal discharge mechanism 160 is structured to drive a growth tray laterally with sufficient force to induce momentum to impel the growth tray 107 laterally along the horizontal receiving segment 152 of roller conveyor 150.

In an embodiment, the horizontal receiving segment 152 of roller conveyor 150 is affixed to a plurality of downwardly directed arcuate roller conveyor segments 154, which are coupled end-to-end to form a spiral conveyor structure. Segments of roller conveyor 150 may be affixed to a central post 156 or other frame members (not shown for clarity) to maintain a rigid spiral structure. The spiral conveyor structure is configured to transfer, by force of gravity, growth trays 107, 172, 174, 176 downwardly from an uppermost third station 120 to a second station 130 and first station 140, terminating or arriving at an end segment 158 coupled to a Y-switch junction 141.

For purposes of illustrating a clear example, FIG. 1 shows roller conveyor having a sparse set of growth trays 107, 172, 174, 176, 143 in different positions on the conveyor; in practice, embodiments may accommodate a large number of growth trays positioned adjacent to one another, and not spaced apart, fully occupying all segments of the roller conveyor. In this manner, growth trays are held on the roller conveyor for relatively long periods of time while plant growth occurs in the trays. Movement of trays along the roller conveyor is induced by gravity when a last tray 143 is removed from the apparatus or moved from the end segment 158 to an end station 159 to the elevator, a harvesting station, or an irrigation station.

In an embodiment, the apparatus comprises means for artificially lighting one or more of the growth trays at one or more of the second stations and for forming thermal layers near the first station, the one or more second stations, and the third station. In an embodiment, trays on the third station 120 may be illuminated by natural light cast on the apparatus via a skylight, windows, other aperture in a structure that contains the apparatus, or lit by one or more artificial lights 121. In an embodiment, growth trays 107, 172, 174, 176, 143 slide from the uppermost, third station 120 down the roller conveyor 150 to the second station 130 after a certain time interval. In an embodiment, the second stations are lit by one or more artificial lights 131. Artificial lighting is preferred in this location because one or more parts of the second station may be shadowed by upper elements of the roller conveyor 150. For the one or more artificial lights, light-emitting diode (LED), halogen, fluorescent fixtures, grow lights, or other light fixtures may be used, coupled to power supplies or line voltage via one or more adapters, transformers, dimmers or controllers.

After another time interval, growth trays 107, 172, 174, 176, 143 are then moved from the second station 130 to the first station 140. In an embodiment, first station 140 represents a lower-most position at or near ground level and/or otherwise convenient for manual attention by staff. At the first station 140, the growth trays may arrive at an end station 159 of the roller conveyor 150 and transfer via Y-switch junction 141 to one or more irrigation stations 142 at which water is applied to the trays. Alternatively, the irrigation station 142 may comprise all of the first station 140 such that all the crops on the first station 140 are watered at once. In some embodiments, the apparatus may comprise multi-level irrigation apparatus 180 comprising an elongated vertical standpipe 182 coupled to one or more nozzles or sprayers 184 that are positioned to selectively apply water to trays in or near one or more of stations 120, 130.

In an embodiment, when it is time for a particular crop to be harvested, either before or after being irrigated, the growth trays 107, 172, 174, 176, 143 may traverse the Y-switch junction 141 to be moved towards a harvester instead of, alongside, or at the same location as the irrigation station 142.

In an embodiment, roller conveyor 150 comprises a skate wheel roller conveyor. Apparatus as described herein for FIG. 1 facilitates the continuous or periodic movement of the growth trays 107, 172, 174, 176, 143 from upper, illuminated and warmer vertical stations to lower, darker, cooler stations. Therefore, the apparatus can be controlled to periodically move the growth trays 107, 172, 174, 176, 143 through an artificial 24-hour day-night cycle in which plants are exposed to natural or artificial lighting in upper stations for a first period, then moved downwardly over time to middle stations with less light, then moved to lower-most stations with little or no light. Movement processes, timing, irrigation and other processes are further described in other sections herein.

Figure 2:
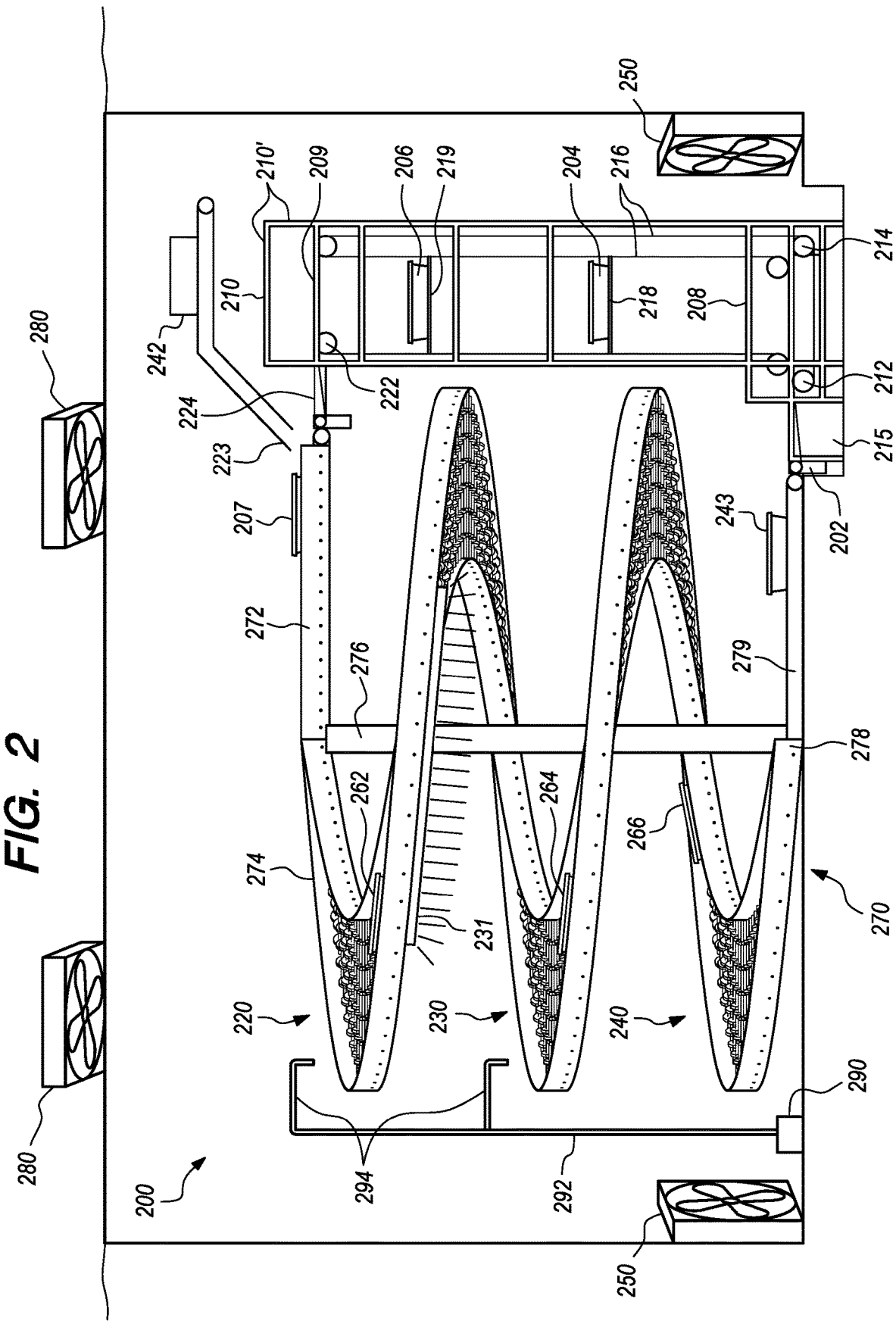
FIG. 2 illustrates an example vertical farming apparatus with which one embodiment could be implemented.

FIG. 2 illustrates an example vertical farming apparatus with which one embodiment could be implemented.

In the embodiment of FIG. 2, an apparatus 200 comprises a main floor 201 at a top or third station 220 rather than a bottom or first station 240. The main floor 201 in FIG. 2 is at or near ground level or floor level, and/or otherwise convenient for manual attention by staff. It may, for example, be at a first floor of a building. The lower stations may be in a cavity. A plurality of growth trays 204, 206 are transported from the first station 240 to the third station 220 by an elevator 210, powered by a motor 202. Stations 208, 209 are vertically spaced apart by a distance ranging from a few feet or meters to dozens of feet or meters.

Elevator 210 may comprise a plurality of frame members 210' such as steel bar or steel tube that are affixed via welding or fasteners to form a fixed, rigid frame in which growth trays travel and on which elevator drive elements are mounted or affixed. Elevator 210 may comprise a plurality of drive wheels and idler wheels 212, 214 that are mechanically coupled to motor 202 via one or more continuous belts 216 affixed to lifting surfaces 218, 219 to form a continuously operable lift mechanism capable of lifting trays 204, 206 when empty or when fully loaded with growth medium, seeds, plants, and water embedded in the growth medium or in a part of the tray.

In an embodiment, elevator 210 further comprises a processor housing 215, usually near the motor 202, comprising a control computer that may drive operation of the elevator under stored program control. The control computer, which is further described in other sections herein, may incorporate wireless networking communication interfaces to deliver a graphical user interface or other user interface to a compatible browser, application or app of a mobile computing device, and to receive input signals and commands relating to elevator action from the mobile device.

The third station 209 is associated with an uppermost lifting position of the elevator 210. In an embodiment, third station 209 may comprise a horizontal discharge mechanism 222 that is configured to drive a growth tray 207 laterally away from or out of the third station to an exit assembly 224 that is adjacent to a horizontal receiving segment 272 of a roller conveyor 270. The motor 202 may drive the horizontal discharge mechanism 222 via a dedicated set of belts and pulleys, gears or wheels, or the horizontal discharge medium may operate using solenoids, air-driven actuators, or other electro-mechanical means, under control of the control computer, to drive the growth tray laterally away from or out of the third station to the exit assembly. In an embodiment, the horizontal discharge mechanism 222 is structured to drive a growth tray laterally with sufficient force to induce momentum to impel a growth tray 207 laterally along the horizontal receiving segment 272 of roller conveyor 270.

In an embodiment, a harvesting station 242 is horizontal to the third station (shown above in FIG. 2 for clarity). The harvesting station may comprise a location of the conveyor to which trays are directed for harvesting manually harvested or using a harvesting device, apparatus, or robot. The harvesting device may harvest the crops as the trays pass from the elevator 210 to the horizontal receiving segment 272. Alternatively, trays ready for harvesting may be diverted by means of a Y-junction 223 to another track with the harvesting station 242 or harvester. In the case of diversion to another track, the trays are replaced with the same or another tray so as to keep the trays close together to push each other along the roller conveyor.

In an embodiment, the horizontal receiving segment 272 of roller conveyor 270 is affixed to a plurality of downwardly directed arcuate roller conveyor segments 274, which are coupled end-to-end to form a spiral conveyor structure. Segments of roller conveyor 270 may be affixed to a central post 276 or other frame members to maintain a rigid spiral structure. The spiral conveyor structure is configured to transfer, by force of gravity, growth trays 207, 262, 264, 266 downwardly from an uppermost third station 220 to a second station 230 and first station 240.

For purposes of illustrating a clear example, FIG. 2 shows roller conveyor having a sparse set of growth trays 207, 262, 264, 266, 243 in different positions on the conveyor; in practice, embodiments may accommodate a large number of growth trays positioned adjacent to one another, and not spaced apart, fully occupying all segments of the roller conveyor. In this manner, growth trays are held on the roller conveyor for relatively long periods of time while plant growth occurs in the trays. Movement of trays along the roller conveyor is induced by gravity when a last tray 243 is removed from the apparatus or enters the elevator 210 to be moved from the first station 208 to the third station 209 again.

In some embodiments, only the third station 220 may be above ground level to use natural geothermal cooling at the lower stations. The first station 240 and the second stations 230 may be in a cavity, which may be underground. The growth trays at the third station may be illuminated by natural light cast on the apparatus via a skylight, windows, other aperture in a structure that contains the apparatus, or lit by one or more artificial lights, not shown in FIG. 2. In an embodiment, growth trays 207, 262, 264, 266 slide from the uppermost, third station 220 down the roller conveyor 270 to the second station 230 after a certain time interval.

In an embodiment, any second station is lit by one or more artificial lights 231. Artificial lighting is preferred in this location because one or more parts of the second station may be shadowed by upper elements of the roller conveyor 270. These lights may be attached to the bottom of the roller conveyor segments for the stations directly above the stations receiving the light. For artificial lighting, light-emitting diode (LED), halogen, grow lights, fluorescent fixtures, or other light fixtures may be used, coupled to power supplies or line voltage via one or more adapters, transformers, dimmers or controllers.

The growth trays may also be irrigated at an irrigation station (not shown) at the third station 220. In an embodiment, the irrigation station may be at one spot on the third station 220. Alternatively, the irrigation station may comprise all of the third station 220. The fact that the third station is at ground level allows for ease of working and fixing any problems with the irrigation system and its plumbing. In other embodiments, as shown in FIG. 2, the apparatus may comprise multi-level irrigation apparatus 290 comprising an elongated vertical standpipe 292 coupled to one or more nozzles or sprayers 294 that are positioned to selectively apply water to trays in or near one or more stations.

In an embodiment, when it is time for a particular crop to be harvested, as either done manually with or without a schedule or done according to a programmed schedule, they are diverted by a junction 223 to a harvest station. In an embodiment, the crops are harvested after returning up the elevator from a simulated night period. In another embodiment, the crops are harvested after a simulated day period. On cycles, where a crop is not ready for harvesting, the growth trays 207 are moved directly from the horizontal discharge mechanism 222 to the horizontal receiving segment 227.

In an embodiment, at a given time interval, the growth trays 207 at the third station 220 slide to the second station 230. At another given time interval, growth trays 264 at the second station 230 are moved to the first station 240. In an embodiment, first station 240 represents a lower-most position below ground level. When the growth trays on the first station 240 slide past an end segment 278 and an end station 279 into the elevator 210, room is made for the growth trays on the other station to slide down by force of gravity. In an embodiment, roller conveyor 270 comprises a skate wheel roller conveyor. Apparatus as described herein for FIG. 2 facilitates the continuous or periodic movement of the growth trays 207, 262, 264, 266, 243 from upper, illuminated and warmer vertical stations to lower, darker, cooler stations. Therefore, the apparatus can be controlled to periodically move the growth trays 207, 262, 264, 266, 243 through an artificial 24-hour day-night cycle in which plants are exposed to natural or artificial lighting in upper stations for a first period, then moved downwardly over time to middle stations with less light, then moved to lower-most stations with little or no light.

In some embodiments, air is pulled into the first station 240 by means of fans 250. The air to this fan comes from ambient air above the third station 220 through a duct. Exhaust fans 280 may also be placed above the third station to pull air out of the structure. These fans may be replaced by any other type of air blower that may serve the same purpose.

Figure 3:
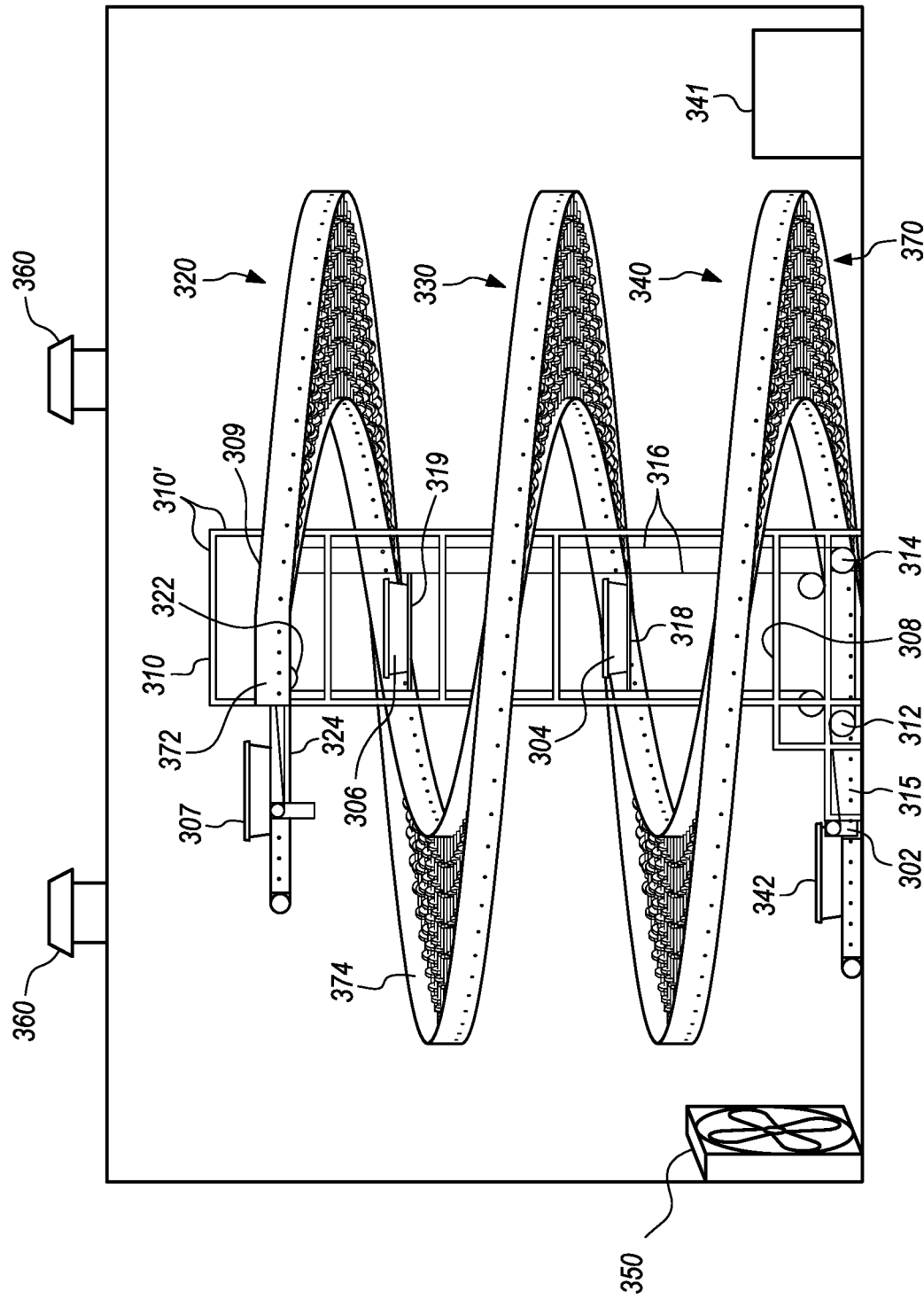
FIG. 3 illustrates an example vertical farming apparatus with which one embodiment could be implemented.

FIG. 3 illustrates an example vertical farming apparatus with which one embodiment could be implemented.

In the embodiment of FIG. 3, an apparatus 300 comprises a main floor 301 at ground level or floor level. From main floor 301, a plurality of growth trays 304, 306 are transported from a first station 308 to a third station 309 by an elevator 310 concentric to the stations, powered by a motor 302. Stations 308 and 309 are vertically spaced apart by a distance ranging from a few feet or meters to dozens of feet or meters.

Elevator 310 may comprise a plurality of frame members 310' such as steel bar or steel tube that are affixed via welding or fasteners to form a fixed, rigid frame in which growth trays 304, 306 travel and on which elevator drive elements are mounted or affixed. Elevator 310 may comprise a plurality of drive wheels and idler wheels 312, 314 that are mechanically coupled to motor 302 via one or more continuous belts 316 affixed to lifting surface 318, 319 to form a continuously operable lift mechanism capable of lifting trays 304, 306 when empty or when fully loaded with growth medium, seeds, plants, and water embedded in the growth medium or in a part of the tray.

In an embodiment, the apparatus is a tower structure with a 12-foot (3.66 m) diameter and a growing spiral with a 10-foot (3 m) diameter. The roller conveyor may be a gravity roller track with a 24-inch to 30-inch (60 cm to 76 cm) width to fit a 24-inch long by 12-inch (60 cm by 30 cm) wide growing container. The spiral may drop 6 inches (15 cm) in a quarter rotation creating a 24-inch (60 cm) space between levels. The height of the tower can range from eight feet to 24 feet (2.4 m to 7.3 m) or even more. In an embodiment, the height of the structure is at least 6 feet (1.83 m), as this is the minimum height that may obtain the benefits of convection. At this height, the effects of temperature stratification and air flow are able to be utilized by the system.

In an embodiment, the humidity surrounding the structure is 40-80%. To get this, an evaporative cooler may be used in dry climates while a dehumidifier may be used in humid climates. In an embodiment, the tower has an intake fan 350 coupled to a swamp cooler (wet wall) and insect screen at a base to push in cool humid air. In an embodiment, the tower operates with a positive pressure helping minimize intrusion of insects or pathogens through any potential gaps in the tower structure. The cool humid air pushed into the first station 340 rises upward and warms as it passes the one or more artificial lights over the second stations 330 and the lights that shine on the third station 320. The warm air escapes through vents 360 on the top of the tower.

In an embodiment, elevator 310 sits concentric to a spiral roller conveyor 370. Elevator 310 further comprises a processor housing 315, usually near the motor 302, comprising a control computer that may drive operation of the elevator under stored program control. The control computer may incorporate wireless networking communication interfaces to deliver a graphical user interface or other user interface to a compatible browser, application or app of a mobile computing device, and to receive input signals and commands relating to elevator action from the mobile device. The elevator 310 lifts the growth trays 304, 306 from a first station 308 to a third station 309.

The third station 309 is associated with an uppermost lifting position of the elevator 310. In an embodiment, third station 309 may comprise a horizontal discharge mechanism 322 that is configured to drive a growth tray 307 laterally away from or out of the third station to an exit assembly 324 that is adjacent to a horizontal receiving segment 372 of a roller conveyor 370. The motor 202 may drive the horizontal discharge mechanism 322 via a dedicated set of belts and pulleys, gears or wheels, or the horizontal discharge medium may operate using solenoids, air-driven actuators, or other electro-mechanical means, under control of the control computer, to drive the growth tray laterally away from or out of the third station to the exit assembly. In an embodiment, the horizontal discharge mechanism 322 is structured to drive a growth tray laterally with sufficient force to induce momentum to impel a growth tray 307 laterally along the horizontal receiving segment 372 of roller conveyor 370. In an embodiment, the horizontal receiving segment 372 of roller conveyor 370 is affixed to a plurality of downwardly directed arcuate roller conveyor segments 374, which are coupled end-to-end to form a spiral conveyor structure around the elevator. Segments of roller conveyor 370 may be affixed to a frame of elevator 310 or other frame members to maintain a rigid spiral structure. The spiral conveyor structure is configured to transfer, by force of gravity, growth trays 307, 342 downwardly from an uppermost third station 320 to a second station 330 and first station 340.

For purposes of illustrating a clear example, FIG. 3 shows roller conveyor having a sparse set of growth trays 307, 342 in different positions on the conveyor; in practice, embodiments may accommodate a large number of growth trays positioned adjacent to one another, and not spaced apart, fully occupying all segments of the roller conveyor. In this manner, growth trays are held on the roller conveyor for relatively long periods of time while plant growth occurs in the trays. Movement of trays along the roller conveyor is induced by gravity when a last tray 342 is removed from the apparatus or moved from an end station to a harvesting station or irrigation station.

In some embodiments, the growth trays 307 at the third station may be illuminated by natural light cast on the apparatus or lit by one or more artificial lights. Some embodiments may have an option for both at different times, with a timer set for turning the lights on. In an embodiment, growth trays 307, 342 slide from the uppermost third station 320 down the roller conveyor 370 to the second station 330 after a specified time interval. There may be any number of second stations 330 between the first station 340 and the third station 320. In an embodiment, second station 330 is lit by one or more artificial lights. Artificial lighting is preferred in this location because one or more parts of the second station may be shadowed by upper elements of the roller conveyor 370. For artificial lighting, light-emitting diode (LED), halogen, fluorescent fixtures, grow lights, or other light fixtures may be used, coupled to power supplies or line voltage via one or more adapters, transformers, dimmers or controllers.

At a next specified interval, the growth trays 304, 306, 307, 342 at the second stations 330 slide down to the next level of second station 330 until the interval comes where they move down to the first station 340. The first station 340 may be at ground level and or in a position where staff has easy access to working with the crops in the growth trays.

In an embodiment, at the first station 340, the growth trays are irrigated from a reservoir 341 adjacent to the first station. This reservoir may be connected to a plumbing system that sprays water onto crops as they pass by a specific spot. Alternatively, the plumbing system may be configured to water all the crops positioned at the first station simultaneously.

Air is blown onto the first station 340 by means of a fan 350. In some embodiments, the air from the fan may first be cooled by an evaporative cooler 351. The air exhaust is through vents 360 above the third station 320.

Figure 4:
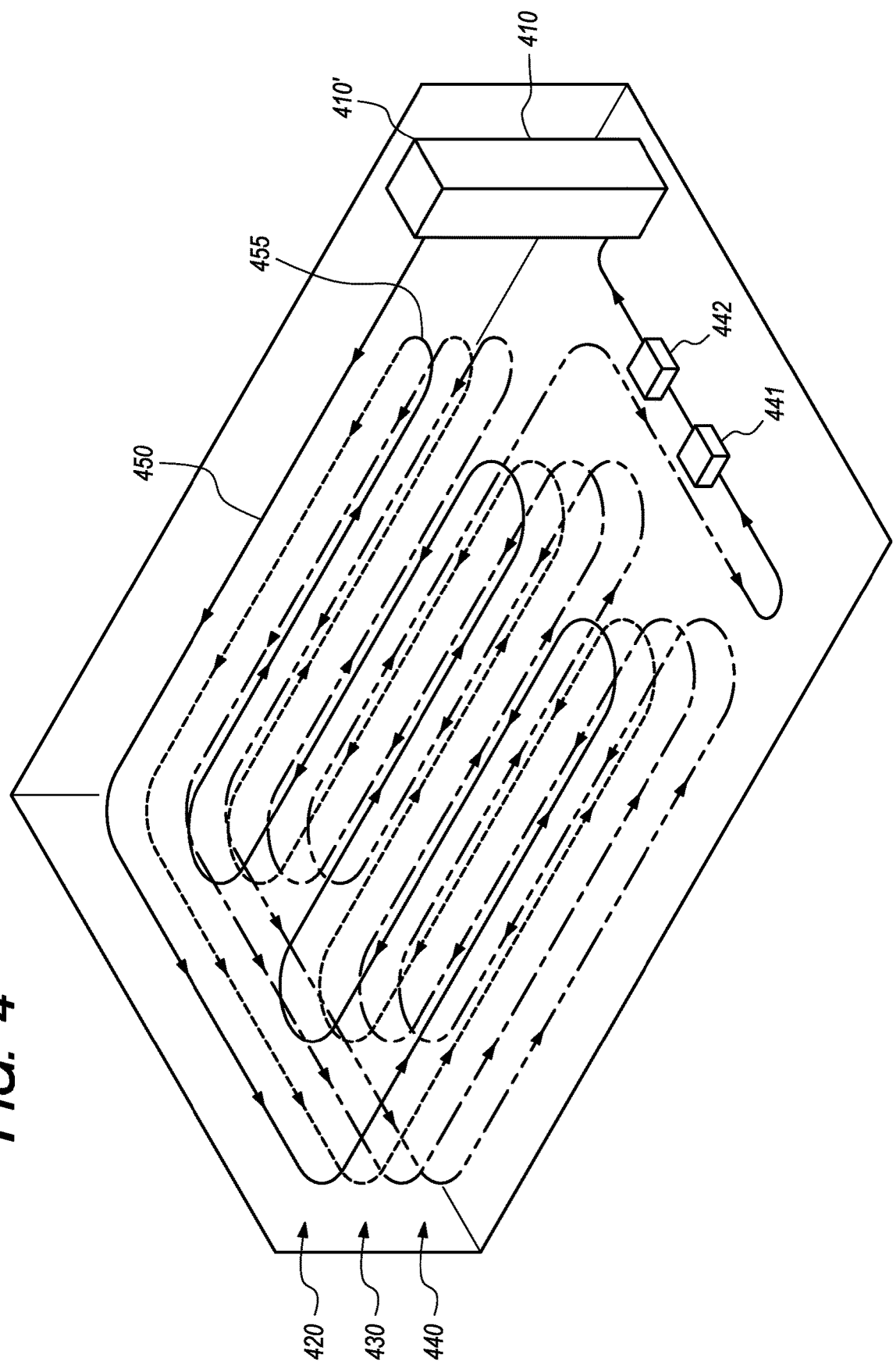
FIG. 4 illustrates an example vertical farming apparatus with which one embodiment could be implemented.

FIG. 4 illustrates an example vertical farming apparatus with which one embodiment could be implemented. In the embodiment of FIG. 4, an apparatus 400 is structured to maximize the use of the space within a small warehouse so far as the number of growth trays that can be accommodated. In an embodiment, the apparatus comprises four stations, the middle two stations being second stations. Apparatus 400 comprises an elevator 410 or lift that moves growth trays from a first station 440 at ground level to a third station 420 at the top of the apparatus. The growth trays on each station are on straight roller conveyor segments 450 which are horizontally parallel to each other with arcuate segments 455 at the end of each stretch of straight roller conveyor segments 450, connecting the parallel straight segments 450. In some embodiments, the effect is like that of a switchback with a gentle decline. In an embodiment, the apparatus has a 25-foot by 30-foot (7.3 m by 9.1 m) footprint and stands 20 feet (6.1 m) high. In an embodiment, the four stations are made up of the combination of straight and arcuate roller conveyor segments 450, 455, with each station alternately reversing the direction of lateral segments, or zig-zagging back and forth, as it stretches from one end of a room to the other. In some embodiments, the stretches of roller conveyor may be arranged such that they are always at a slightly downward slope so as to utilize the effects of gravity. Each parallel stretch of straight roller conveyor segments 450 may be a few feet or meters long for tight spaces or several hundred feet or meters long for a small to mid-sized warehouse. The apparatus may be held up using a plurality of support beams at each rounded corner or along the sides of the stations. These support beams may be made of metal such as steel and held together by welding or other fasteners.

In an embodiment, apparatus 400 comprises a main floor at ground level. Here, multiple growth trays are transported from a first station 440 to a third station 420 by an elevator 410, powered by a motor. Stations 440, 420 are vertically spaced apart by a distance ranging from a few feet or meters to dozens of feet or meters. Elevator 410 may comprise a plurality of frame members 410' such as steel bar or steel tube that are affixed via welding or fasteners to form a fixed, rigid frame in which growth trays travel and on which elevator drive elements are mounted or affixed. Elevator 410 may comprise a plurality of drive wheels and idler wheels that are mechanically coupled to a motor via one or more continuous belts affixed to lifting surface to form a continuously operable lift mechanism capable of lifting growth trays when empty or when fully loaded with growth medium, seeds, plants, and water embedded in the growth medium or in a part of the tray.

In an embodiment, elevator 410 is adjacent to the stations. Elevator 410 further comprises a processor housing, usually near the motor, comprising a control computer that may drive operation of the elevator under stored program control. The control computer may incorporate wireless networking communication interfaces to deliver a graphical user interface or other user interface to a compatible browser, application or app of a mobile computing device, and to receive input signals and commands relating to elevator action from the mobile device. The elevator 410 lifts the growth trays from a first station 440 to a third station 420.

The third station 420 is associated with an uppermost lifting position of the elevator 410. In an embodiment, third station 420 may comprise a horizontal discharge mechanism that is configured to drive a growth tray laterally away from or out of the third station to an exit assembly that is adjacent to a horizontal receiving segment of a roller conveyor. The motor may drive the horizontal discharge mechanism via a dedicated set of belts and pulleys, gears or wheels, or the horizontal discharge medium may operate using solenoids, air-driven actuators, or other electro-mechanical means, under control of the control computer, to drive the growth tray laterally away from or out of the third station to the exit assembly. In an embodiment, the horizontal discharge mechanism is structured to drive a growth tray laterally with sufficient force to induce momentum to impel a growth tray laterally along the horizontal receiving segment of roller conveyor.

At a specified interval, the growth trays on the third station 420 slide along a roller conveyor segments 450 to a second station 430. At a second specified time interval, the growth trays on the second station slide down to the first station 440 as all the trays move. At the first station, the growth trays go through a harvesting station 441 for the crops to be harvested at the proper time, either manually or using a mechanical harvester, and then through to an irrigation station 442, where the crops are watered. When the growth trays are moved off of the first station 440 back onto the elevator 410, room is made for all the other growth trays to slide down to the next vertical stations.

In some embodiments, the growth trays at the third station may be illuminated by natural light cast on the apparatus or lit by one or more artificial lights. Some embodiments may have an option for both at different times, with a timer set for turning the lights on. In an embodiment, growth trays slide from the uppermost third station 420 down the roller conveyor to the second stations 430 after a specified time interval. There may be any number of second stations 430 between the first station 440 and the third station 420. In an embodiment, second station 430 is lit by one or more artificial lights. Artificial lighting is preferred in this location because one or more parts of the second station may be shadowed by upper elements of the roller conveyor. For artificial lighting, light-emitting diode (LED), halogen, fluorescent fixtures, grow lights, or other light fixtures may be used, coupled to power supplies or line voltage via one or more adapters, transformers, dimmers or controllers.

Figure 5:
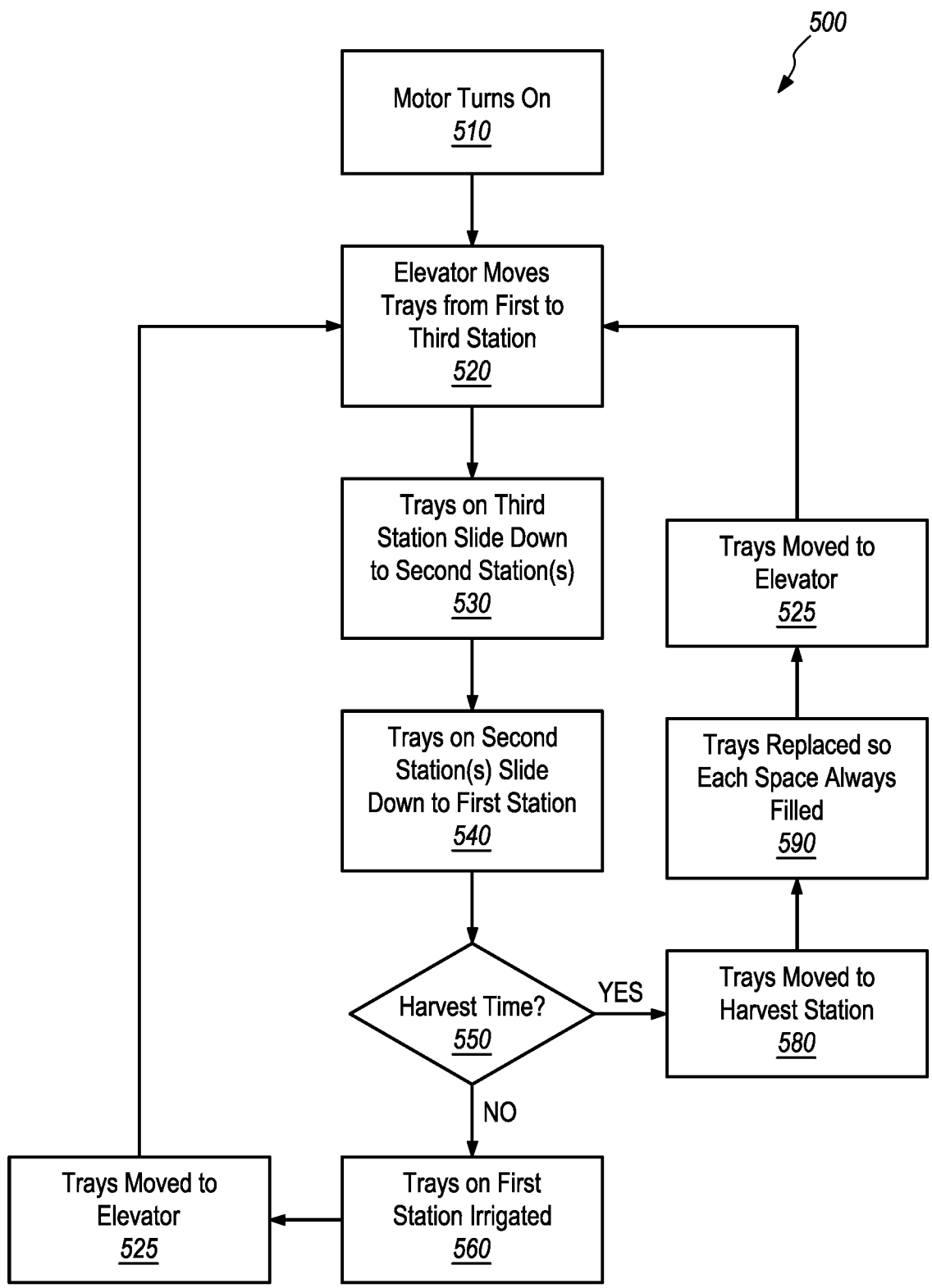
FIG. 5 illustrates an example process for moving growth trays through the different levels of the apparatus of any of FIG. 1, FIG. 2, FIG. 3, FIG. 4.

FIG. 5 illustrates an example process for moving growth trays through the different levels of the apparatus of any of FIG. 1, FIG. 2, FIG. 3, FIG. 4.

In one embodiment, a motor controlling the elevator drives all vertical movement of growth trays. A growth tray reaching the top of the elevator may be driven laterally into an upper station via a horizontally mounted hydraulic or pneumatic jack, a jackscrew driven by the same motor or a separate motor, or a pneumatic actuator. Thereafter, the force of gravity may cause growth trays to move down the conveyor to a subsequent, lower station.

The motor may be controlled by a computing device. The same computer that controls the elevator may control the artificial lights, the irrigation system, the harvester and in some embodiments, the roller conveyor directly, under coordinated stored program control. In some embodiments, there is one program that can be set to move the trays, water the crops within the trays, turn the lights on and off, and harvest the crops automatically. These different elements may use different motors and switches. The controls for the artificial lights and irrigation system may have set timers for turning the lights and the water on and off automatically, or this may be done manually with or without a schedule.

Referring again to FIG. 5, in an embodiment, a process for moving trays 500 begins when, at step 510, the motor starts operating. In some embodiments, the motor is started manually, according to intervals. In others, motor operation is controlled according to preset intervals which have been programmed using the computer system. The sliding of the growth trays and static positioning of irrigation and harvesting stations allows for a more frequent rotation than is feasible for other large-scale vertical farming systems.

Time intervals may vary based on type of crop or total number of stations. In one embodiment, time intervals may be staggered off of a 24-hour cycle so as to allow workers to work with a different set of plants on different days, all while maintaining regular work hours. In some embodiments, the growing containers complete a cycle through the vertical farming apparatus every 18-30 hours as opposed to a regular 24-hour cycle. For example, an apparatus with three stations may run on six-hour intervals, such that the growth trays on the first station from 6 A.M. to noon one day may be at the third station from 6 A.M. to noon the next day and the second station from 6 A.M. to noon the third day in a cycle. In another example, an apparatus with five stations may run on four-hour intervals, such that each set of growth trays will be in a position to be easily accessed by staff without use of stools, scissor lifts, or ladders at the same time of day every five days.

In an embodiment, at step 520, when the motor is turned on, the elevator moves one or more growth trays from a first station to a third station. In an embodiment, the cycle time is maintained and/or adjusted by controlling the vertical lift motor speed and on-time frequency.

At step 530, growth trays on the third station move down to the vertically adjacent second station by the force of gravity. The growth trays on the second station move to the next vertically adjacent second stations until they arrive at the first station, at step 540, by continuing to slide down by the force of gravity.

At the first station, an individual can manually change the path of the growth trays for harvesting or the stored program control can be set to determine whether it is harvest time for the crops and automatically change the path, at step 550.

If plant material in a growth tray has reached a harvest point, the trays are manually or automatically diverted to a harvest station, at step 580. In some embodiments, this harvest station is a place where staff has easy access to harvesting crops and in others this harvest station consists of a mechanical harvesting device. Subsequently, any trays taken off the main track of the roller conveyor to the harvest station may be replaced on the main conveyor so each space is always filled, at step 590. In embodiments where the harvesting is done at the first station, there is the added benefit of harvesting the crops after a simulated night cycle while the crops are at peak flavor and peak moisture retention for greatest fresh weight. If it is not harvest time, the trays are moved through an irrigation station at step 560 and back to the elevator at step 525 to start the cycle again as indicated by step 520.

Alternatively, the irrigation may happen before the crops are moved to the harvest station. In embodiments where the harvesting station is at the third rather than the first station, the decision for harvest time may happen after the step of lifting the growth trays in the elevator. In embodiments where there are multiple irrigation stations, the irrigation step will happen more frequently between multiple different steps.

In some embodiments, plants experience a 10-15 degree temperature difference between the top of the system and the bottom of the system. A temperature differential may improve control of metabolism of plants. Temperature stratification between the different levels, aided by heat generation from the lights causing an upward airflow, may help further imitate a similar cycle to what plants would experience outside. Furthermore, plant circadian rhythms are influenced by environmental cues including both light and temperature. These signal to plants to extend or shorten the internal circadian rhythm to match their flow through the vertical growing cycle.

In an example embodiment, the steps of the method are programmed into a computer attached to the apparatus. This computer may be attached to a control panel allowing for input on one end and an output comprising electrical connections to motors that drive the system on the other.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
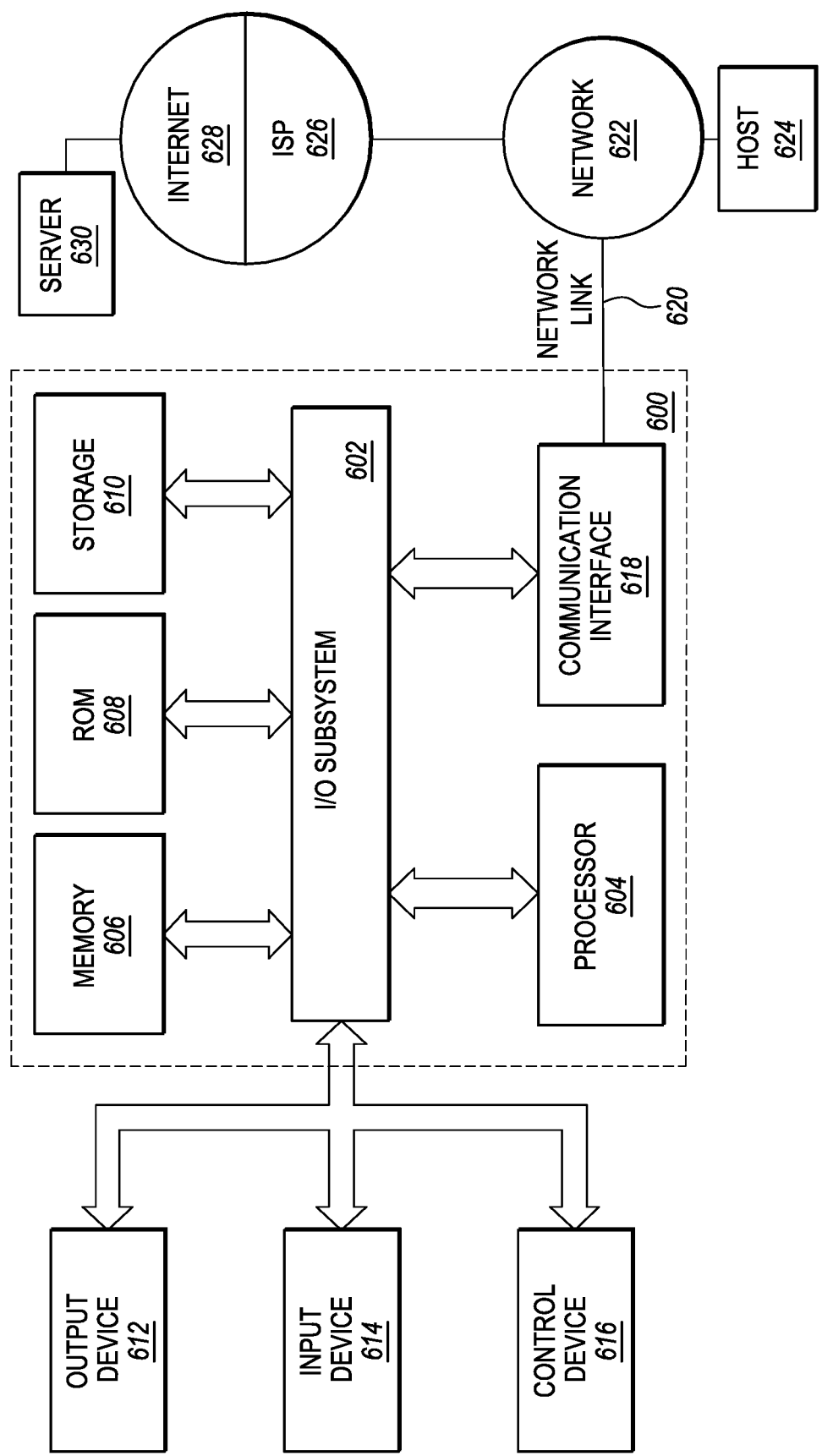
FIG. 6 illustrates a computer system with which one embodiment could be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on output device 612, which may be a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A multi-level farming apparatus comprising:
a transport elevator having a plurality of lift elements and a drive mechanism to selectively elevate one or more growth trays using the lift elements from a first station at a lowest vertical level, through one or more second stations at intermediate higher vertical levels, to a third station at a highest vertical level;
one or more of the second stations comprising one or more artificial lights that are configured to selectively light one or more of the growth trays at one or more of the second stations;
a roller conveyer having an upper end near the third station, and a lower end near the first station, the roller conveyor being configured to receive a particular one of the growth trays from the third station and convey the particular one of the growth trays to the first station;
near the first station, the roller conveyor comprising a Y switch, the Y switch comprising a transfer mechanism to direct one of the growth trays to a harvesting apparatus and a normal flow segment to direct one or more other growth trays to the transport elevator;
a control computer that is communicatively coupled to the first station, the transport elevator and the third station, and programmed to cause transporting the growth trays successively from the first station, to the third station, to one or more of the second stations, and then back to the first station through two or more thermal layers.

2. The apparatus of claim 1 comprising two of the second stations and the control computer being programmed to cause the transporting of the growth trays successively from the first station, to the third station, to the one or more of the second stations, and then back to the first station to occur within a specified time interval.

3. The apparatus of claim 1, only the first station comprising an irrigation apparatus configured to selectively apply water to one or more of the growth trays at the first station.

4. The apparatus of claim 3, the control computer being programmed to selectively apply water to the one or more of the growth trays at the first station during one or more irrigation periods within a first period of a plurality of successive time periods.

5. The apparatus of claim 1, the first station being a simulated night station.

6. The apparatus of claim 1, further comprising:
the roller conveyor comprising a continuous spiral between the first and third stations; and
the transport elevator being within the spiral.

7. The apparatus of claim 1, the transport elevator being laterally adjacent to the stations.

8. The apparatus of claim 7, the roller conveyor further comprising:
a plurality of parallel linear conveyor segments, each of the parallel linear conveyor segments being inclined between a pair of the stations;
a plurality of arcuate conveyor segments, each of the arcuate conveyor segments having a first arc end coupled to a first one of the parallel linear conveyor segments and a second arc end coupled to a second one of the parallel linear conveyor segments.

9. The apparatus of claim 8, further comprising:
at least a first pair of the parallel linear conveyor segments, and a first pair of the arcuate conveyor segments, forming a first inclined level of the roller conveyor;
at least a second pair of the parallel linear conveyor segments, and a second pair of the arcuate conveyor segments, forming a second inclined level of the roller conveyor at a higher vertical elevation than the first inclined level.

10. The apparatus of claim 9, only the third station comprising an irrigation apparatus configured to selectively apply water to one or more of the growth trays at the third station.

11. The apparatus of claim 1, further comprising:
the third station being coplanar with a first floor level of a building that houses the apparatus;
a cavity having an upper open end that is coplanar with the first floor level and a lower end that is vertically below the first floor level;
the first and second stations being in the cavity.

12. The apparatus of claim 11, further comprising:
one or more vertical ducts, each of the ducts having an upper end communicating with ambient air above the cavity and a lower end;
one or more air blowers, each of the air blowers having an intake coupled to the lower end of one of the vertical ducts and a discharge positioned to supply air drawn from above the cavity toward the first station.

13. The apparatus claim 1, further comprising:
one or more ducts, each of the ducts having an outer end communicating with ambient air outside the multi-level farming structure and a lower end;
one or more air blowers, each of the air blowers having an intake coupled to the lower end of one of the ducts and a discharge positioned to draw air from the outside the multi-level farming structure toward the first station.

14. The apparatus of claim 1, further comprising artificial lights above the third station, the artificial lights of the apparatus being configured to develop thermal layers near the first station, the one or more second stations, and the third station.

15. The apparatus of claim 1, further comprising the artificial lighting apparatus being under the roller conveyer near the third station and any one or more of the second stations which are not directly above the first station.

16. The apparatus of claim 1, the artificial lighting apparatus comprising a plurality of light-emitting diode (LED) lights.

17. A multi-level farming apparatus comprising:
transport means for selectively elevating one or more growth trays from a first station at a lowest vertical level, through one or more second stations at intermediate higher vertical levels, to a third station at a highest vertical level;
means for artificially lighting one or more of the growth trays at one or more of the second stations;
conveying means for receiving a particular one of the growth trays from the third station and conveying the particular one of the growth trays to the first station;
near the first station, the roller conveyor comprising a Y switch, the Y switch comprising a transfer mechanism to direct one of the growth trays to a harvesting apparatus and a normal flow segment to direct one or more other growth trays to the transport means;
control means that is communicatively coupled to the first station, the transport means and the third station, for causing the transport means to transport the growth trays successively from the first station, to the third station, to one or more of the second stations, and then back to the first station through two or more thermal layers.

18. The apparatus of claim 17, the means for artificially lighting being powered to generate heat to form thermal layers near the first station, the one or more second stations, and the third station.

19. The apparatus of claim 17, the means for artificially lighting being powered to generate the thermal layers having a temperature difference between the first station and the third station ranging from 5 degrees F. to 20 degrees F.

20. The apparatus of claim 17, the control means being configured for causing the transport means to transport the growth trays successively from the first station, to the third station, to one or more of the second stations, and then back to the first station through the thermal layers to simulate natural daily day and night temperature fluctuations.

21. A method of transportation in a multi-level farming structure, the method comprising:
selectively elevating, using an elevator, one or more growth trays from a first station at a lowest vertical level, through one or more second stations at intermediate higher vertical levels, to a third station at a highest vertical level;
near the first station, a conveyor comprising a Y switch, the Y switch comprising a transfer mechanism to direct one of the growth trays to a harvesting apparatus and a normal flow segment to direct one or more other growth trays to the elevator;
artificially lighting one or more of the growth trays at one or more of the second stations;
receiving a particular one of the growth trays from the third station and conveying, using the conveyor, the particular one of the growth trays to the first station;
transporting the growth trays successively from the first station, to the third station, to one or more of the second stations, and then back to the first station through two or more thermal layers.

22. The method of claim 21, further comprising, the artificial lighting generating heat to form thermal layers near the first station, the one or more second stations, and the third station.

23. The method of claim 21, further comprising, the lighting generating the thermal layers having a temperature difference between the first station and the third station ranging from 5 degrees F. to 20 degrees F.

24. The method of claim 21, further comprising transporting the growth trays successively from the first station, to the third station, to one or more of the second stations, and then back to the first station through the thermal layers to simulate natural daily day and night temperature fluctuations.

\* \* \* \* \*